United States Patent [19]
Gold

[11] Patent Number: 5,525,173
[45] Date of Patent: Jun. 11, 1996

[54] METHOD OF ATTACHING A CARTON ADDRESS LABEL

[76] Inventor: Peter Gold, 465 N. Wood Rd., Rockville Centre, N.Y. 11570

[21] Appl. No.: 436,610

[22] Filed: May 8, 1995

[51] Int. Cl.⁶ .................................................. B29C 65/06
[52] U.S. Cl. ............. 156/73.5; 156/324.4; 156/DIG. 36; 156/DIG. 51
[58] Field of Search .................. 156/73.5, 73.6, 156/579, 580, DIG. 21, DIG. 36, DIG. 37, DIG. 51, 324.4, 580.2; 264/68

[56] References Cited

U.S. PATENT DOCUMENTS

| | | | |
|---|---|---|---|
| 1,735,236 | 11/1929 | Dennis | 366/129 |
| 2,192,264 | 5/1940 | Kallander | 156/DIG. 51 |
| 3,586,590 | 6/1971 | Brenneisen | 156/580.2 |
| 3,793,112 | 2/1974 | Sontag et al. | 156/DIG. 21 |
| 5,099,106 | 3/1992 | Biancone | 156/DIG. 36 |

*Primary Examiner*—David A. Simmons
*Assistant Examiner*—J. Sells

[57] ABSTRACT

A method of attaching an adhesively backed carton address label by vigorous rubbing over the label surface with a curved-wire device that does not snag, causing frictional heat to supplement the adhesion of the label rear surface to the carton.

1 Claim, 2 Drawing Sheets

5,525,173

METHOD OF ATTACHING A CARTON ADDRESS LABEL

The present invention relates generally to addressing a cardboard shipping carton, and more particularly to affixing an adhesive label for this purpose to the shipping carton that effectively resists inadvertent detachment during transit of the carton.

As is well known, to facilitate label attachment, the label rear surface has an adhesive coating which prior to use is covered by a release panel and which, when peeled, exposes the adhesive for use. The adhesive coating is thus typically primarily in a solid state of nominal thickness and optionally may be wetted to be made "tacky" or left as is, incident to being placed into contact with a shipping carton. However, even coatings of adhesive with a chemical content capable of providing significant adhesion nevertheless often become detached from the shipping carton due to normal abuse of handling during transit because the adhesive and the underlying carton panel is limited to simple surface-to-surface contact, rather than a more desirable penetration or diffusion of the adhesive beneath and within the interior construction of the cardboard panel.

Broadly, it is an object of the present invention to establish attachment of an adhesively backed label to a cardboard shipping carton panel using heat to cause adhesive penetration into the panel, thereby overcoming the foregoing and other shortcomings of the prior art.

More particularly, it is an object to use as a source of heat a generated friction utilizing a known kitchen utensil, as illustrated and described in U.S. Pat. No. 1,735,236, for this seemingly non-related label-attaching use, having recognized that the materials of construction and configuration of the utensil are uniquely suited for this different purpose, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a face view of a dough blender made in accordance with U.S. Pat. No. 1,735,236;

Figure 1:
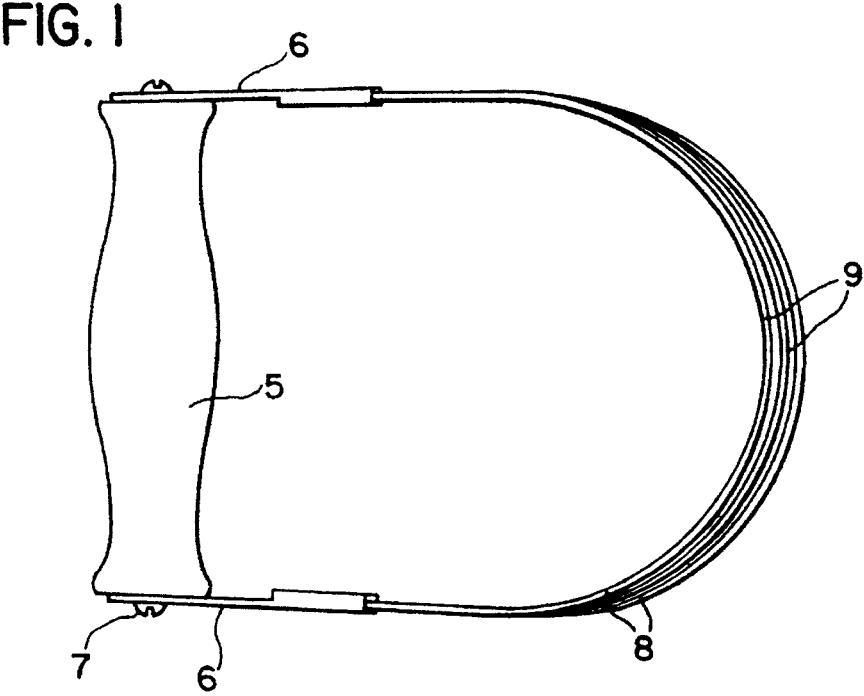
Figure 2:
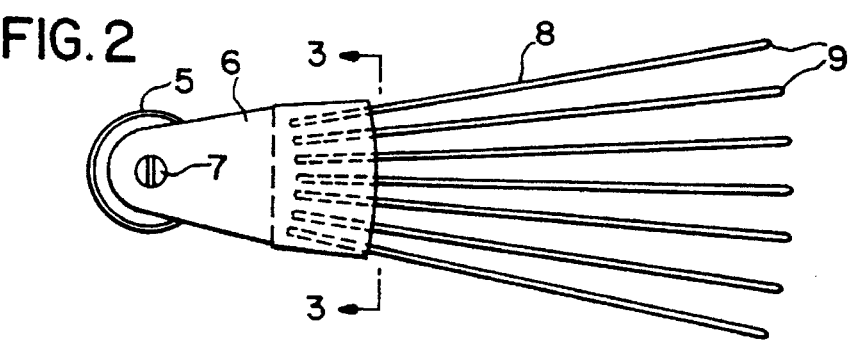
FIG. 2 is a side view of FIG. 1.
Figure 3:
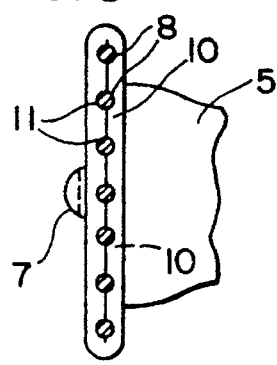
FIG. 3 is an enlarged sectional detail taken on the line 3—3 of FIG. 2 looking in the direction of the arrows.
Figure 4:
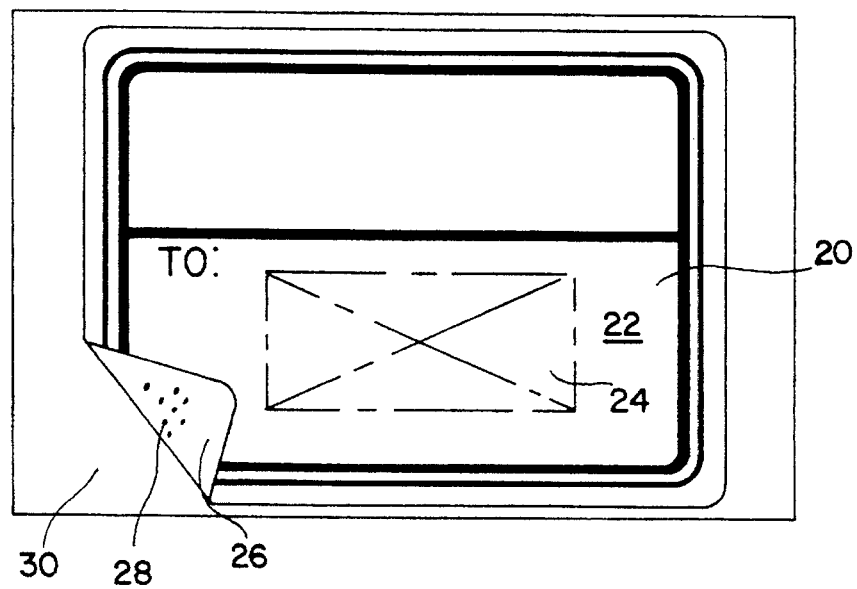
FIG. 4 is an isolated front elevational view of an address label.
Figure 5:
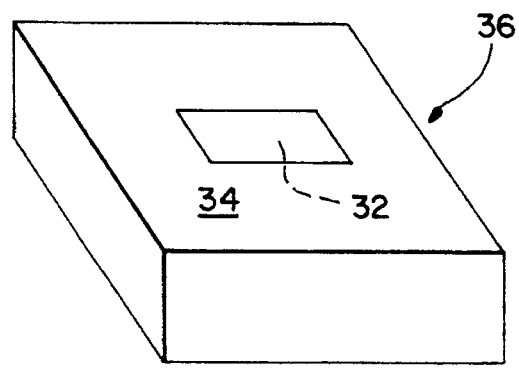
Figure 6:
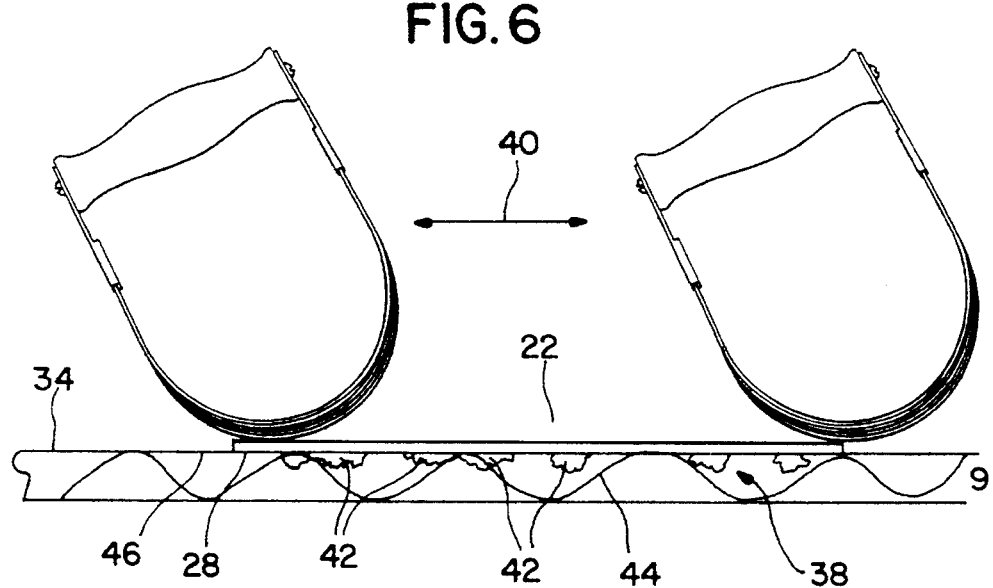

FIG. 5 is a front elevational view of the address label of FIG. 4 adhesively attached to a panel of a cardboard shipping carton; and FIG. 6 illustrates in full line perspective stationary contact established between the device of FIGS. 1–3 with said adhesively attached label and carton of FIG. 5 and, in phantom perspective, the conversion of said stationary contact into rubbing contact, it being further understood that the size of the device of FIGS. 1–3 is significantly reduced in scale and the size of the attached label and carton on FIG. 5 is significantly enlarged in scale, to better facilitate an understanding of the within invention.

THE KITCHEN UTENSIL OF U.S. PAT. NO. 1,735,236 OF FIGS. 1, 2 AND 3

The utensil comprises a handle 5, preferably wooden, to the ends of which are fastened a pair of plates 6, as by means of screws 7. The plates are suitably of a soft malleable sheet iron for a reason presently to appear. A plurality of laterally spaced blade-like mixers or cutters 8 are carried by the handle on the holder plates 6. These mixers or cutters are of music wire or any other hard spring wire which may be found to be suitable for the present purpose. The hardness of the wire is taken advantage of in the fastening of the mixers or cutters, as will presently appear. At this point, it will be observed that each piece of wire forming one of the mixers is bowed outwardly with reference to the handle to provide a tread portion at 9 intermediate the ends thereof. The group of mixers have the tread portions disposed out of alinement transversely, as clearly appears in FIG. 2, thus approximately in an arc also bowed outwardly with reference to the handle. Thus, by reason so the longitudinal arcuateness and the transverse arcuateness, the tread portion of the utensil is substantially spherical in form. This makes the same easily adaptable to various shapes of mixing bowls, many of which will be found to conform quite closely to the shape of the tread portion of the utensil. There is, therefore, less crushing and grinding of the dough than might otherwise be the case. As a result, the pie crust produced in the use of the present device is found to be much flakier than is the case with other devices available up to the present time. The flakiness is, of course, a clear evidence of the thorough blending of the shortening with the flour.

The wire mixers or cutters 8, in order to have the proper spacing at the tread portions, diverge outwardly with respect to the handle 5. The ends of the wires as clearly appears in dotted lines in FIG. 2 are overlapped by the holder plates 6 for a substantial portion of the length thereof. Each of the holder plates is of fairly soft sheet metal and has the parts 10 arranged to be bent over the ends of the relatively hard wires to confine the same, the wires being then clamped permanently and securely in place by subjecting the plates to considerable pressure in a press or between dies. The pressure is sufficient to cause the hard wire to embed itself in the relatively soft sheet metal, as clearly appears at 11 (see FIG. 3). This method of fastening the wires is, of course, extremely cheap but is found to add to the durability of the article and does not leave crevices where particles of dough would be apt to lodge. It is, therefore, much easier to keep the article lean. The fanned out arrangement of the wires does not necessitate the use of pieces of wire of different lengths, as will be observed in FIG. 2, for the reason that the plates overlap the ends of the wires to such an extent. The covering of the raw ends of the wires is obviously of advantage in that there are no sharp edges exposed.

THE LABEL-ATTACHING METHOD OF FIGS. 4, 5 AND 6

Illustrated in FIG. 4 is a known shipping label 20 of paper construction material having a front surface 22 imprinted with an address 24 and a rear surface 26 having an adhesive coating 28 which is exposed for use upon the peeling removal of a release panel 30. Label 20 is adhesively attached, as at 32, to a front panel 34 of a cardboard shipping carton 36 and, as often occurs, inadvertently becomes detached because of insufficient adhesion to panel 34, resulting in an inability to make proper delivery of the carton 36. At best, this results in delay and, at worst, in the loss of the carton.

Underlying the present invention is the recognition that the adhesive attachment provided by the adhesive coating 28 is the result merely of surface contact that is established between the coating 28 and the carton panel 34 and, being so limited, is often inadequate for the purposes intended and, to withstand the normal abuse of transit of the carton 36, must be supplemented by being diffused into the porosity of the cardboard construction material 38 of the panel 34. Such diffusion requires heat to change the solid state of the adhesive coating 28 to a fluid state to allow for flow or penetration of the adhesive beneath the surface of the panel 34. In accordance with the present invention, from a starting condition of stationary contact established by the bowed wire loops 9 with the label imprinted surface 22 heat is generated as friction by rubbing contact of the bowed wire loops 9 back and forth across the label imprinted surface 22, in rubbing strokes 40, for a selected time interval until the label surface 22 is warm to the touch. The generated frictional heat melts and softens the adhesive coating 28 such that a portion 42 thereof penetrates into the voids of the cardboard construction of the undulating flutes 44 through the porosity of the top paper ply 46 and subsequently solidifies, to significantly supplement the adhesion of the label 20 to the carton panel 34.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A method of attaching an address label to a panel of a cardboard shipping carton using a known device of a type having a handle and extending in attached relation therefrom an arrangement of plural adjacently spaced closed bowed loops of pieces of selected hard wire construction material, said method comprising the steps of adhesively attaching said address label having a front surface imprinted with an address and a rear surface with an adhesive-coating thereon to said cardboard carton panel, establishing stationary contact of said bowed wire loops against said imprinted label surface, and converting said stationary contact into rubbing contact for a selected time duration until said imprinted label surface is warm to the touch, whereby said rubbing contact of said bowed wire loops generates frictional heat to supplement the adhesion of said label rear surface to said shipping carton without attendant snagging to said label front surface as might mar the legibility of the address imprinted thereon.

\* \* \* \* \*